United States Patent [19]
Roediger et al.

[11] Patent Number: 5,960,198
[45] Date of Patent: Sep. 28, 1999

[54] SOFTWARE PROFILER WITH RUNTIME CONTROL TO ENABLE AND DISABLE INSTRUMENTED EXECUTABLE

[75] Inventors: Robert Ralph Roediger; William Jon Schmidt, both of Rochester, Minn.

[73] Assignee: International Business Machines Corporation, Armonk, N.Y.

[21] Appl. No.: 08/821,671

[22] Filed: Mar. 19, 1997

[51] Int. Cl.[6] ..................................................... G06F 9/44
[52] U.S. Cl. ........................ 395/704; 395/705; 395/709; 395/707; 395/708
[58] Field of Search .................................. 395/704, 705, 395/707, 708, 709, 183.01, 183.13, 183.14

[56] References Cited

U.S. PATENT DOCUMENTS

| | | | |
|---|---|---|---|
| 4,847,755 | 7/1989 | Morrison et al. | 364/200 |
| 4,914,590 | 4/1990 | Loatman et al. | 364/419 |
| 4,947,315 | 8/1990 | Sokolow et al. | 364/200 |
| 5,014,185 | 5/1991 | Saito et al. | 364/188 |
| 5,021,945 | 6/1991 | Morrison et al. | 364/200 |
| 5,179,703 | 1/1993 | Evans | 395/700 |
| 5,193,180 | 3/1993 | Hastings | 395/575 |
| 5,212,794 | 5/1993 | Pettis et al. | 395/700 |
| 5,265,254 | 11/1993 | Blasciak et al. | 395/700 |
| 5,333,304 | 7/1994 | Christensen et al. | 395/575 |
| 5,335,344 | 8/1994 | Hastings | 395/575 |
| 5,355,487 | 10/1994 | Keller et al. | 395/650 |
| 5,412,799 | 5/1995 | Papadopoulos | 395/500 |
| 5,428,782 | 6/1995 | White | 395/650 |
| 5,450,586 | 9/1995 | Kuzara et al. | 395/700 |
| 5,465,258 | 11/1995 | Adams | 395/700 |
| 5,517,628 | 5/1996 | Morrison et al. | 395/375 |
| 5,522,036 | 5/1996 | Shapiro | 395/183.14 |
| 5,535,329 | 7/1996 | Hastings | 395/183.11 |
| 5,539,907 | 7/1996 | Srivastava et al. | 395/700 |
| 5,752,062 | 5/1998 | Gover et al. | 395/183.13 |
| 5,768,500 | 6/1998 | Agrawal et al. | 395/184.01 |

OTHER PUBLICATIONS

Balasa, F., et al., "Transformation of Nested Loops with Modulo Indexing to Affine Recurrences", *Parallel Processing Letters*, vol. 4, No. 3 (Sep. 1994), pp. 271–280.

Conte, T.M., et al., "Hardware–Based Profiling: An Effective Technique for Profile–Driven Optimization", *International Journal of Parallel Progamming*, vol. 24, No. 2, Apr. 1996, pp. 187–206.

Conte, T.M., et al., "Using Branch Handling Hardware to Support Profile–Driven Optimization", *International Symposium on Microarchitecture*, 27th, Nov. 30–Dec. 2, 1994, pp. 12–21.

Kishon, A., et al., "Semantics Directed Program Execution Monitoring", *J. Functional Programming*, vol. 5, No. 4, Oct. 1995, pp. 501–547.

Pettis and Hansen, "Profile Guarded Code Positioning", *Proceedings of the ACM SIGPLAN '90 Conference on Programming Language Design and Implementation*, Jun. 20–22, 1990, pp. 16–27.

"Program Restructuring Technique for Improving Memory Management Performance", *IBM Technical Disclosure Bulletin*, vol. 39, No. 03, Mar. 1996, pp. 203–205.

Schmidt, W., et al., "Profile–Directed Restructuring of Operating System Code[1]", *Restructuring of Operating System Code*, Jan. 7, 1997, pp. 1–9.

Speer, S.E., et al., "Improving UNIX Kernel Performance using Profile Based Optimization", *1994 Winter USENIX*, Jan. 17–21, 1994, pp. 181–188.

"Statistics Gathering and Analyzing Tool for Open Software Foundation's Distributed Computing Environment", *IBM Technical Disclosure Bulletin*, vol. 37, No. 02B, Feb. 1994, pp. 215–217.

Youfeng, W, et al., "Static Branch Frequency and Program Profile Analysis", *International Symposium on Microarchitecture*, 27th, Nov. 30–Dec. 2, 1994, pp. 1–11.

Hansen, R.C., "New optimizations for PA–RISC compilers," HP Journal, v43, n3, p15(9), ISSN: 0018–1153, Jun. 1992.

Kishon, A. et al., "Semantics Directed Program Execution Monitoring," J. Functional Programming, vol. 5, No. 4, pp. 501–547, Oct. 1995.

Conte, T.M, et al., "Using Branch Handling Hardware to Support Profile–Driven Optimization," Int. Symp. on Microarch., 27th, pp. 12–21, Dec. 2, 1994.

Conte, T.M., et al., "Hardware–Based Profiling: An Effective Technique for Profile–Driven Optimization," Int. Journal of Parallel Prog., vol. 24, No. 2, pp. 187–206, Apr. 1996.

*Primary Examiner*—Tariq H. Hafiz
*Assistant Examiner*—Todd Ingberg
*Attorney, Agent, or Firm*—Schmeiser, Olsen & Watts

[57] ABSTRACT

Disclosed is a system and method for a profiling system wherein the collection of profile data may be enabled and disabled during the execution of an instrumented computer program. The invention utilizes a dedicated bit in a condition register which is checked each time a block of instrumentation code is to be executed. If the bit is enabled, the instrumentation code is executed and profile data is collected. If the bit is not enabled, then the instrumentation block is skipped and not executed and no profile information is collected. The enabling and disabling of the bit in the condition register may be implemented in hardware, in software, or in a combination of the two.

48 Claims, 3 Drawing Sheets

SOFTWARE PROFILER WITH RUNTIME CONTROL TO ENABLE AND DISABLE INSTRUMENTED EXECUTABLE

FIELD OF THE INVENTION

The present invention relates to the optimization of computer program instructions. More particularly, the present invention relates to a profiling system and method that provides runtime control over the generation of profile information.

BACKGROUND OF THE INVENTION

The development of the EDVAC computer system of 1948 is often cited as the beginning of the computer era. Since that time, dramatic advances in both hardware (i.e., the computer's electronic components) and software (i.e., computer programs) have drastically improved the performance of computer systems. However, modern software programs, often containing millions of instructions, have become very complex when compared with early computer programs. Because the execution time (and hence, performance) of a computer program is very closely related to the number of instructions contained in the program, developers must continue to find new ways of improving the efficiency of computer software.

Most modern computer programs are typically written in a high-level language that is easy to understand by a human programmer. Special software tools, known as compilers, take the human-readable form of a computer program, known as "source code," and convert it into machine-readable instructions, known as "object code." Because a compiler generates the stream of instructions that are eventually executed on a computer system, the manner in which the compiler converts the source code into object code affects the execution time of the computer program.

As noted, the continual desire to use larger, faster and more complex software programs has forced system developers to find new methods of improving the rate at which programs run. Software developers have focused a great deal of effort on developing methods of generating efficient computer instructions that can take full advantage of the hardware systems on which they are to be executed. Such methods of improving the sequencing or placement of computer instructions within a computer program are referred to as optimizations. Numerous optimization techniques to improve the performance of software are known in the art today.

Profiling is one technique that can be used to improve software optimization. Profiling uses predicted information on how a program will run to further optimize the computer program. For example, if it is known that certain blocks of code (i.e., distinct portions of a program) will be executed more often than other code blocks, performance may be enhanced by handling those blocks of code in a particular manner. (E.g., it might be desirable to position the code blocks in memory in a manner that improves the utilization of cache memory.) Thus, profiling seeks to improve optimizations and therefore system performance by using information regarding the expected behavior of blocks of code within a computer program. Specifically, by identifying popular code blocks and execution paths, software programs can be created to maximize the performance of the hardware on which they will run.

In order to implement any profiling system, accurate profile or behavior information must be collected by first running the program on a set of inputs believed to represent typical usage of the program. This process of collecting profile information is referred to as "benchmarking." The collection of accurate profile data during the benchmarking phase is critical if profile based optimizations are to improve performance. However, a present limitation with known profiling systems includes the fact that such systems assume a model in which data-collection is active whenever the program is running. That is, as soon as the program is initiated, profiling information is continuously collected until program execution is terminated. Thus, there is no way to turn profiling on and off during program execution. Although this model is reasonable for simple, self-contained programs running benchmarks of low complexity, there are many situations where it is not desirable to collect profile data during the entire execution lifetime of a program. For example, some procedures within a program may exhibit a certain kind of behavior during initialization, and a very different behavior during the rest of the program's execution. Thus, it may be desirable to defer profile data collection until after the program has finished initialization.

This limitation is further pronounced in the case of complex software systems that are designed to run persistently, such as computer operating systems. Most computer systems utilize a continuously running operating system to provide an interface between the computer hardware and end-user. Because operating systems must fulfill a variety of tasks (e.g., booting the system, launching application programs, interfacing with hardware devices, etc.), the continuous collection of profile data may be inappropriate when attempting to examine the performance characteristics of specific tasks. Many times the performance benchmarks of interest for such a system require that the system be brought up to a "steady state" before the benchmarks can be accurately established. Thus, any benchmark data collected prior to the achievement of a steady state could pollute the targeted data being gathered.

Finally, there is no way of collecting profile data for multiple independent benchmarks on a continuously running program (such as an operating system) without having to stop and restart the program. Therefore, under known systems, the program must be re-executed each time an additional set of profile data is desired.

Thus, a need exists for a low overhead mechanism that will provide better control over the generation and collection of profile data. Without such a system, the ability to perform accurate profile based optimizations will be limited.

SUMMARY OF THE INVENTION

The present invention provides a system and method for controlling the generation of profile information during the execution of a computer program. The invention features a compiler program that includes: (1) a code generator that converts a first instruction stream into a second instruction stream wherein said second instruction streams includes machine readable code; (2) an instrumentation mechanism that inserts packets of instrumentation code into the second instruction stream for profiling purposes; and (3) an enabling mechanism that inserts enabling instructions into the second instruction stream wherein said enabling instructions provide a mechanism for enabling and/or disabling the execution of instrumentation code during runtime.

The above may be accomplished by having the enabling mechanism insert at least one instruction into the second instruction stream that causes a control bit in a condition register to be examined to determine if the instrumentation code should or should not be executed. The instruction(s)

can then cause program control to branch past the instrumentation code if the control bit is not enabled.

The invention also features a method of controlling the generation of profile information during the execution of a computer program wherein the computer program has instrumentation code blocks embedded therein. The steps include: (1) beginning the execution of the computer program on a central processing unit (CPU); (2) causing at least one bit (e.g., a control bit) in a condition register to be set to a predetermined value by a profile control mechanism; (3) checking the bit in the condition register prior to the execution of each instrumentation code block in the computer program; (4) executing the instrumentation code block if the control bit is enabled; and (5) omitting the execution of the instrumentation code block if the control bit is disabled.

It is therefore an advantage of the present invention to provide a mechanism wherein profiling can be turned on and off during the execution of a computer program.

It is therefore a further advantage of the present invention to provide a low overhead mechanism for controlling the generation and collection of profile data in complex software systems such as operating systems.

It is therefore a further advantage of the present invention to provide a system wherein profile data may be collected for multiple independent benchmarks on a continuously running program (such as an operating system) without having to stop and restart the program.

BRIEF DESCRIPTION OF THE DRAWINGS

The preferred embodiments of the present invention will hereinafter be described in conjunction with the appended drawings, where like designations denote like elements, and.

DESCRIPTION OF THE PREFERRED EMBODIMENT

Figure 1:
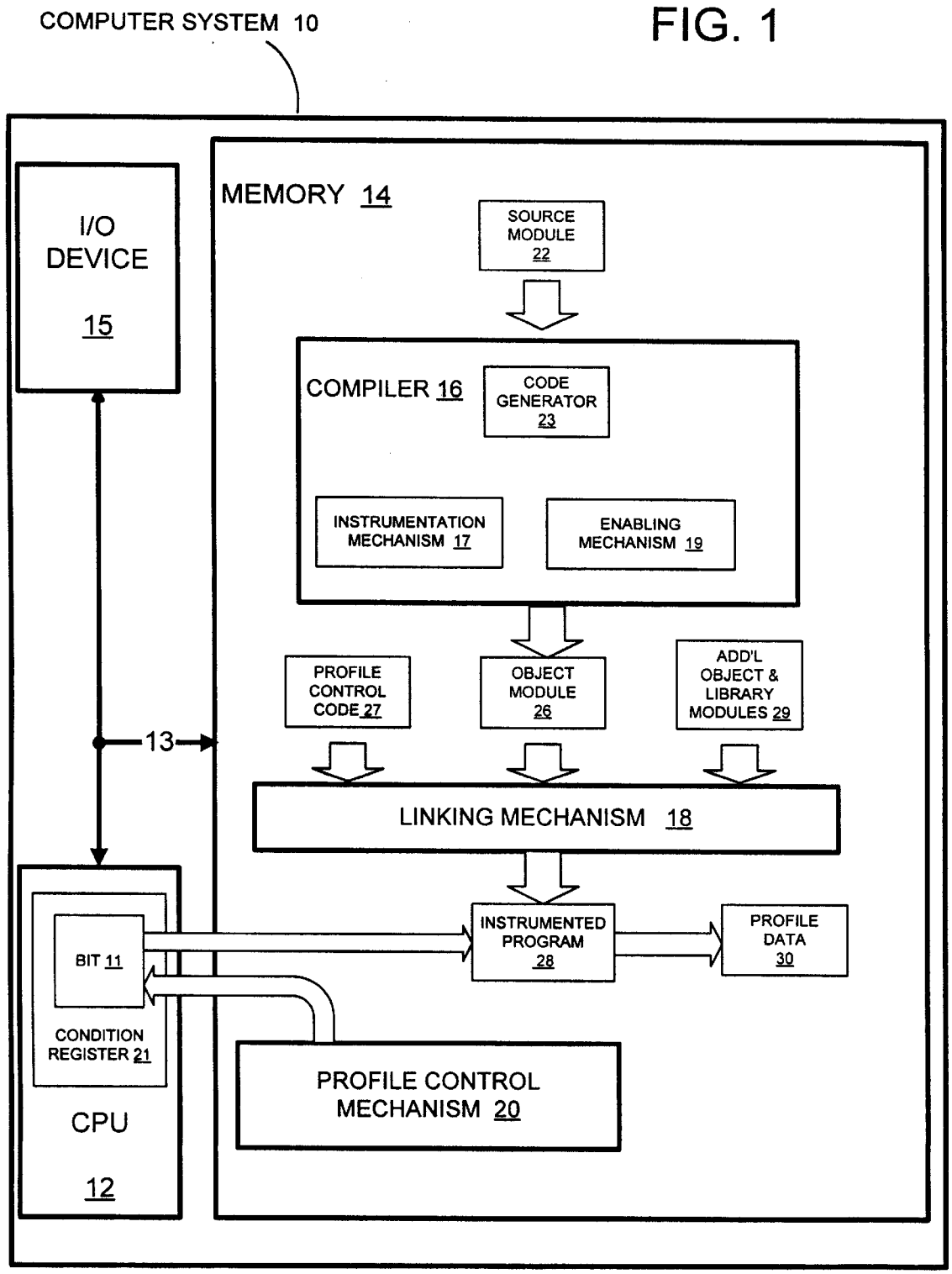
FIG. 1 depicts a block diagram of a computer system that includes a compiler mechanism in accordance with a preferred embodiment of the present invention.

The present invention relates to optimization of computer programs using profile data. For those that are not experts in the field, the Overview section below provides general background information that will be helpful in understanding the concepts of the invention.

OVERVIEW
1. Profiling

Many modern software development environments include a profiling mechanism that uses information collected about a program's runtime behavior (known as profile data) to improve optimization of that program. "Profile data" as used herein means any estimates of execution frequencies in a computer program, regardless of how the estimates are generated.

There are various profiling systems, or mechanisms for generating profile data. Examples include instrumenting profilers, trace-based profilers, and sampling profilers. Instrumenting profilers operate by recompiling the program with special instrumentation "hooks" placed at important branch points. As the instrumented program executes, these hooks cause data counters to be updated, recording the branch history directly. Trace-based profilers operate by collecting an execution trace of all the instructions executed by the program. They then reduce the information to a manageable size to determine how often each branch in the program was taken and not taken. A sampling profiler operates using a hardware timer, periodically waking up a process that records the address of the currently executing instruction. While the present invention is generally concerned with improvements in instrumenting profilers, it is recognized that any other type of profiling system could be covered by certain aspects of this invention.

As noted above (with regard to instrumenting profilers), the program must first be retrofitted with instrumentation code (i.e., hooks) that causes profile information to be saved when the program is executed on a representative set of inputs. Instrumentation code typically involves strategically inserted instructions that count how often a block of code is executed or how often a certain path is taken (i.e., how often block A transfers control to block B). Once the profile information is collected, it can then be used to optimize the very program from which it was collected. Various methods of optimizing program code with profile data are known in the art. Thus, a typical instrumenting profiling system includes (1) an instrumentation phase where a program is retrofitted with "information collecting" instructions; (2) a benchmarking phase where the program is run and profile information is collected; and (3) an optimization phase where the program is recompiled and modified in light of the profile information.

2. Compilers

Executable computer programs are typically constructed by software programs called compilers. Initially, a programmer first drafts a computer program in human readable form (called source code) prescribed by the programming language, resulting in a source code instruction stream or module. The programmer then uses mechanisms that change the human readable form of the computer program into a form that can be understood by a computer system (called machine-readable form, or object code). Additional processing, such as linking, may then occur. Linking involves a process where multiple object modules are combined together to create a single executable computer program. The mechanisms described herein are typically called compilers; however, it should be understood that the term "compiler," as used within this specification, generically refers to any mechanism that transforms one representation of a computer program into another representation of that program.

The machine-readable form, within this specification, is a stream of binary instructions (i.e., ones and zeros) that are meaningful to the computer. Compilers generally translate each human readable statement in the source code instruction stream into zero or more intermediate language instructions, which are then converted into corresponding machine-readable instructions. Special compilers, called optimizing compilers, typically operate on the intermediate language instruction stream to make it perform better (e.g., by eliminating unneeded instructions, etc.). Some optimizing compilers are wholly separate while others are built into a primary compiler (i.e., the compiler that converts the human readable statements into machine readable form) to form a multi-pass compiler. In other words, multi-pass compilers first operate to convert source code into an instruction stream in an intermediate language understood only by the compiler (i.e., as a first pass or stage) and then operate on the intermediate language instruction stream to optimize it and convert it into machine-readable form (i.e., as a second pass or stage).

A compiler may reside within the memory of the computer which will be used to execute the object code, or may reside on a separate computer system. Compilers that reside on one computer system and are used to generate machine code for other computer systems are typically called "cross compilers." The methods and apparatus discussed herein apply to all types of compilers, including cross compilers and assemblers.

Many of today's compilers include mechanisms for performing profiling operations. In particular, compilers can automatically insert instrumentation code into the created object modules during the compilation process. Thus, an instrumented computer program can be automatically generated. Once the instrumented program is built, it can be executed on a set of inputs believed to represent a typical runtime environment to generate profile data. The profile data can then be used during a recompilation process to create an optimized version of the computer program. This invention deals with the process of providing improved instrumentation code that gets inserted into the created object modules. The result is an instrumented computer program that allows for control over the collection of profile data during the execution of the computer program.

DETAILED DESCRIPTION

Referring now to the figures, FIG. 1 depicts a computer system 10 having a central processing unit (CPU) 12, a memory 14, and an input/output (I/O) device 15. CPU 12, I/O device 15 and memory 14 are operably connected via bus 13. Those skilled in the art will appreciate that the mechanisms and apparatus of the present invention apply equally to any computer system, regardless of whether the computer system is a complex multi-user computer apparatus, a single user workstation, or an apparatus (e.g., a television, an automobile, etc.) having a computer device embedded therein. In addition, it should be recognized that other computer system components, such as cache, additional I/O devices and network interfaces, while not shown, may be included in computer system 10. Additionally, although computer system 10 is shown to contain only a single CPU 12 it should be understood that the present invention applies equally to computer systems that have multiple CPU's.

Pursuant to this invention, memory 14 is shown containing a compiler 16 that can compile one or more source modules 22 and subsequently output one or more object modules 26. Compiler 16 includes a code generator 23, an instrumentation mechanism 17, and an enabling mechanism 19. It should be recognized that compiler 16 may also include additional components (not shown) such as a preprocessor, optimizer, an integrated linker, etc. Compiler 16 and linker 18 are software programs that are executable on CPU 12 and in addition to being storable in memory 14, may be stored as program products on any type of storage medium including magnetic media, optical disks, transmission media, etc. Moreover, it should be recognized that source module 22 and object module 26 may exist in the form of a file, a stream of inputted instructions inputted via I/O device 15, or any other known representation.

Code generator 23 represents the component of compiler 16 that creates machine-readable code based upon the instructions provided in source module 22. Instrumentation mechanism 17 represents the system that directs compiler 16 to insert instrumentation code blocks into the instruction stream (i.e., object module 26) created by code generator 23. These instrumentation code blocks will ultimately cause profile information to be generated when the machine instructions are executed. Enabling mechanism 19 represents the system that directs compiler 16 to insert enabling instructions into the object module 26 to give profile control mechanism 20 the ability to enable and disable the generation of profile information during the execution of the program instructions. Although this preferred embodiment utilizes a traditional compiler system 16 (i.e., one that translates source modules to object modules) as the means by which instrumentation code is inserted into program 28, it is understood that any other mechanism capable of inserting instrumentation code into an executable program falls within the scope of this invention. For example, a program that reads in an executable program and outputs an instrumented executable program should be considered a suitable alternative. The critical aspect of this invention is enabling mechanism 19, which provides runtime control over the generation of profile data 30.

Enabling mechanism 19 operates by inserting instructions that will cause control bit 11 in condition register 21 to be examined before the execution of any instrumentation code. If the bit 11 is enabled (e.g., has a value of "1") program control will cause the instrumentation code to be executed and therefore generate profile data. Conversely, if the bit 11 is not enabled (e.g., it is a "0"), program control will be routed around the instrumentation code such that it is not executed and therefore result in a condition where profile data is not generated. Thus, the generation of profile data during program execution is dependent upon the control bit 11 in condition register 21.

Object module 26, once created, can be linked with additional object modules and library modules 29 by linking mechanism 18 to create an instrumented program 28. It should be recognized that the linking mechanism 18 may be integrated within compiler 16 such that compiler 16 can generate an instrumented program 28 directly from source module 22. Additionally, profile control code 27 may also be linked with object module 26 to include additional decision making criteria regarding the collection of profile information.

Once the compiler 16 and linking mechanism 18 have generated instrumented program 28, the program 28 can be executed on CPU 12 (or on some other CPU) on a set of inputs believed to represent a typical runtime environment in order to generate profile data 30. Pursuant to this embodiment, however, profile control mechanism 20 is used to regulate the generation of profile data 30. Profile control mechanism 20 controls the generation of profile data 30 by providing an external means by which control bit 11 can be enabled or disabled during the execution of instrumented program 28. Profile control mechanism 20 will typically be implemented at least in part by software and act independently and externally to the instrumented program 28. Thus, if the profile control mechanism 20 enables control bit 11, profile data 30 will be generated any time a packet of instrumentation code is to be executed. Conversely, any time profile control mechanism 20 disables control bit 11, profile data 30 will not be generated.

Profile control mechanism 20 may utilize any known system for controlling the enabling and disabling of control bit 11. For example, profile control mechanism 20 could set the control bit 11 when a predetermined keyboard command (e.g., "enable profiling" or "disable profiling") gets entered at the command line from I/O device 15. In other situations, such as where a command line is not available during the execution of a computer program, a simultaneously running software program could be utilized to control the enabling and disabling of control bit 11. Thus, enabling and disabling could be controlled or triggered by various system events, such as a system clock, a read/write to a particular memory location, a network request, etc. In summary, any means for changing the control bit 11 during the execution of the instrumented computer program 28 may be utilized.

Figure 2:
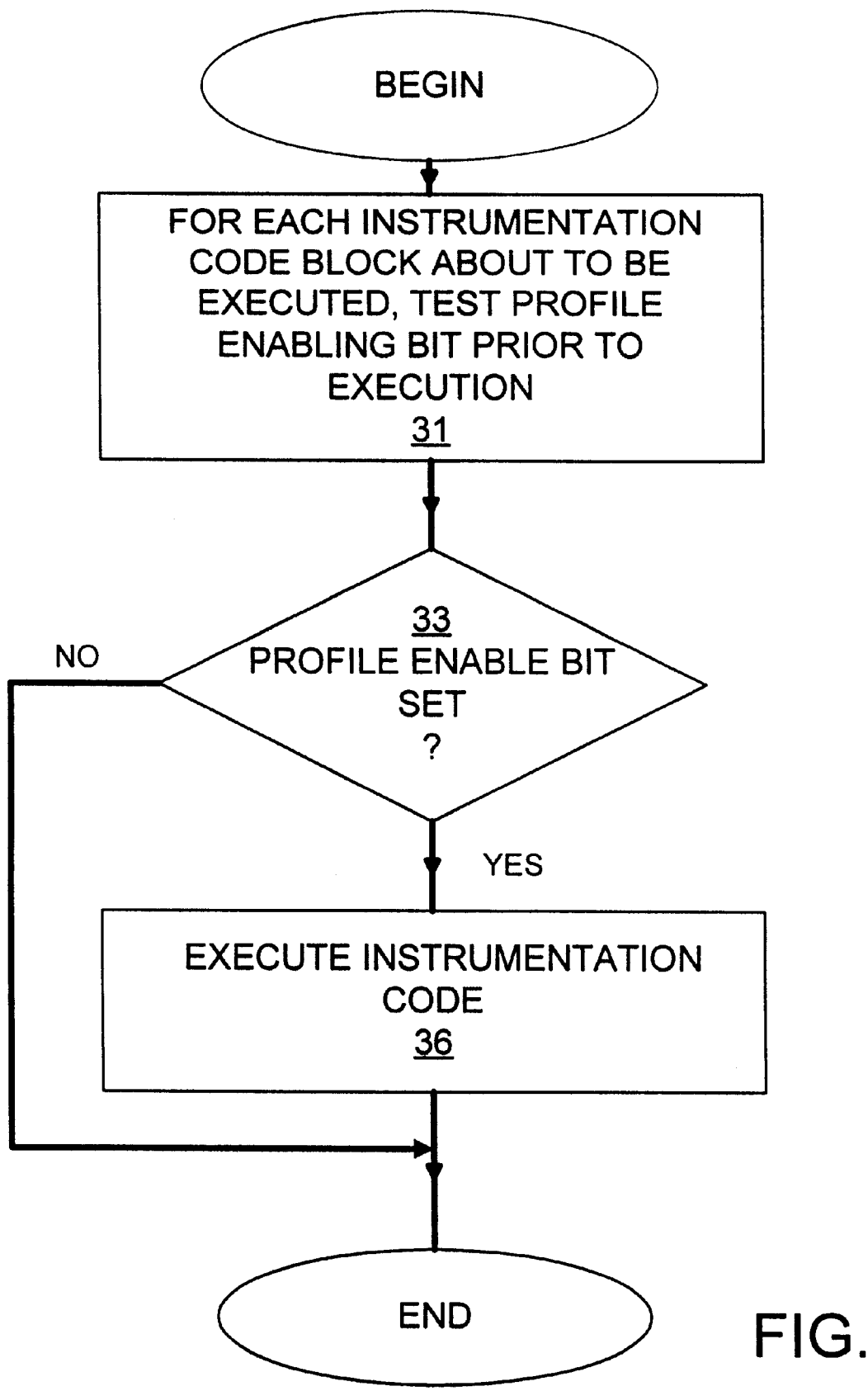
FIG. 2 depicts a flow diagram of a method of controlling the execution of profile data in accordance with a preferred embodiment of the present invention.

Referring now to FIG. 2, a flow diagram is shown depicting the basic steps involved in implementing profile control. First, the instrumented program 28 containing instrumentation code with the above-described enabling mechanism is executed. Then, for each instrumentation code block about to be executed (step 31), a profiling enable bit (i.e., control bit 11) is tested (step 33) just prior to execution. If the profile enabling bit is set, the instrumentation code is executed (step 36). If the profile bit is not set, the instrumentation code is not executed.

In the preferred embodiment, the profile enabling bit 11 is implemented from a condition register 21 in the processor used for executing instrumented program 28. It should be recognized however, that while a condition register 21 is used for the preferred embodiment, any globally dedicated register could likewise be used as a substitute as long as it is addressable during execution by both the program 28 being executed and the profile control mechanism 20. Moreover, the bit need not be part of a register, but may comprise any memory space that is available and addressable by both the program 28 and the control mechanism 20. Finally, several bits (e.g., a dedicated portion of a register), as opposed to just one bit, may be used to provide more than two levels of control over profile information generation.

For this preferred implementation, each instrumentation code block includes an initial instruction that checks the status of the control bit 11 in the condition register 21, and then directs control of execution based on the status of that bit. For instance, if the bit 11 is enabled, then the instrumentation code will be executed. If the bit 11 is not enabled, then the instruction will cause control to be transferred elsewhere. In this preferred embodiment, a branch false statement (bf) is utilized to perform both the checking and branching functions. However, it is recognized that the exact implementation may vary and depend upon the type of instructions available for the particular processor. It is further recognized that any type of conditional branch statement or equivalent thereof could be substituted. Below is an example of an instrumentation block (written in a generic assembly language) that includes an enabling mechanism:

| 1 |       | bf    | LABX, CR6.3               |
|---|-------|-------|---------------------------|
| 2 |       | load  | GPRy, <counter address>   |
| 3 |       | add   | GPRy, GPRy, 1             |
| 4 |       | store | GPRy, <counter address>   |
| 5 | LABx: |       |                           |

The instruction of line 1 "bf" (branch false) causes a particular bit (i.e., 6.3) in the condition register CR to be checked for a true or false condition. If the condition is false (i.e., the bit=0), program control branches to LABx on line 5, thereby skipping the execution of the instrumentation code on lines 2–4. Alternatively, if the condition is true (i.e., the bit=1), lines 2–4 are executed thereby causing a specific counter to be incremented.

Figure 3:
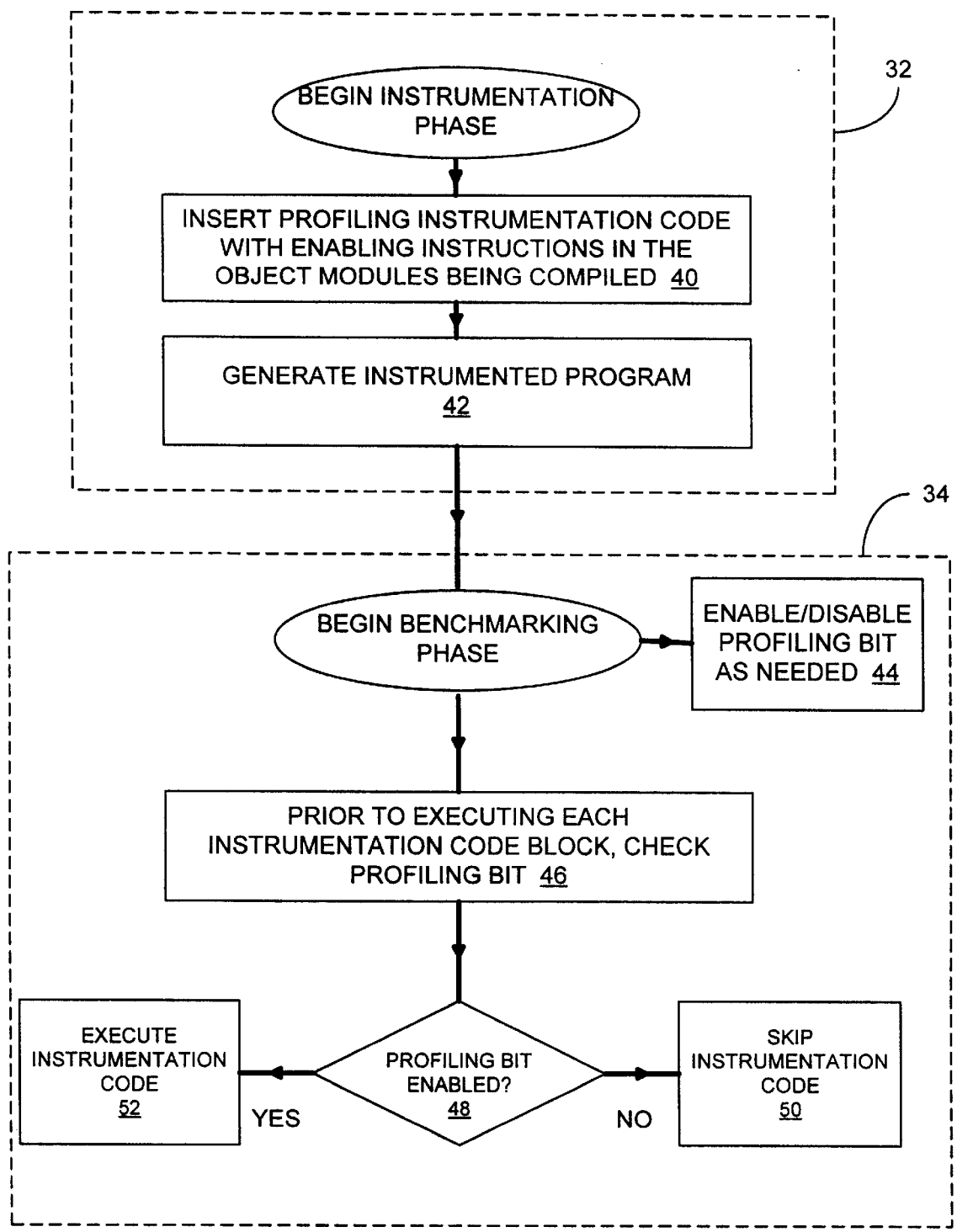
FIG. 3 depicts a flow diagram of a method of generating a computer program with instrumentation code and then controlling the generation of profile data in accordance with a preferred embodiment of the present invention.

Referring now to FIG. 3, a flow chart is shown depicting both the instrumentation 32 and benchmarking 34 phases of the present invention. The instrumentation phase 32 generally involves the process of compiling the source code modules 22 to generate an instrumented program 28. The instrumentation phase 32 includes the step of inserting profiling instrumentation code (that includes at least one enabling instruction) into each object module (step 40) being created by the compiler 16. This step may be done in an integrated manner during the compilation process or possibly may be done after the compilation step. Finally, the instrumented computer program 28 is generated (step 42), typically by linking together the object modules using linking mechanism 18. As noted above, an intermediate linking step may be utilized to link individual object modules, libraries, etc. together to create a final instrumented computer program 28.

Once the instrumented computer program 28 is created, the benchmarking phase 34 is implemented. Two processes, the execution of program 28 and the enabling/disabling of the profiling bit 11, will actually be occurring in parallel during this phase. Thus, anytime during (or prior to) the execution of the program 28, the profiling bit (i.e., control bit 11) in condition register 21 on CPU 12 can be enabled and/or disabled on the fly by control mechanism 20. The step of enabling or disabling the profiling bit (step 44) may be accomplished in a variety of ways, such as by a user at a command line prompt while the instrumented computer program 28 is executing, by a simultaneously running software mechanism, by some combination of software and hardware, etc. Any conceivable type of triggering event to cause the profiling bit to become enabled or disabled is considered to be within the scope of this invention.

Instrumented computer program 28 will be executed on a set of inputs believed to represent a typical runtime environment. During the execution, the profiling bit will be checked each time an instrumentation code block is about to be executed (step 46). If the profiling bit is enabled (step 48), the instrumentation code is executed (step 52). Alternatively, if the profiling bit is not enabled then the instrumentation code is skipped (step 50).

The embodiments and examples set forth herein were presented in order to best explain the present invention and its practical application and to thereby enable those skilled in the art to make and use the invention. However, those skilled in the art will recognize that the foregoing descriptions and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

We claim:

1. An instrumented executable program comprising:
    a mechanism that causes profile information to be generated each time an instrumented code block is executed; and
    a mechanism that allows the generation of profile information to be enabled and disabled during runtime by a source external to said instrumented executable program.

2. The instrumented executable program of claim 1 wherein said source external to said instrumented executable program comprises a keyboard input.

3. The instrumented executable program of claim 1 wherein said source external to said instrumented executable program comprises a simultaneously running software program.

4. The instrumented executable program of claim 1 wherein said source external to said instrumented executable program comprises a hardware signal.

5. An apparatus comprising:
a processing unit;
a memory system, said memory system being connected to said processing unit; and
a compiler program stored in said computer system memory for execution on said central processing unit, said compiler program including:
  a code generator that converts a first instruction stream into a second instruction stream wherein said second instruction stream includes machine readable code;
  an instrumentation mechanism that inserts blocks of instrumentation code into said second instruction stream for profiling purposes; and
  an enabling mechanism that inserts enabling instructions into said second instruction stream wherein said enabling instructions include a mechanism that can enable and disable the execution of said blocks of instrumentation code.

6. The apparatus of claim 5 wherein said enabling mechanism inserts at least one instruction that causes a dedicated portion of a register to be examined to determine if at least one of said instrumentation code blocks should be executed.

7. The apparatus of claim 6 wherein said at least one instruction that causes said dedicated portion of said register to be examined instructs said at least one of said instrumentation code blocks not to be executed if said dedicated portion of said register is not set to a predetermined value.

8. The apparatus of claim 6 wherein said dedicated portion of said register is a bit.

9. The apparatus of claim 6 wherein said register is a condition register.

10. The apparatus of claim 6 further comprising a profile control mechanism that sets a value in said dedicated portion of said register during the execution of said second instruction stream.

11. The apparatus of claim 5 wherein said enabling mechanism inserts at least one instruction that causes a dedicated memory space to be examined to determine if at least one of said instrumentation code blocks should be executed.

12. The apparatus of claim 11 wherein said at least one instruction that causes said dedicated memory space to be examined on said computer system instructs said at least one of said instrumentation code blocks not to be executed if said memory space is not set to a predetermined value.

13. The apparatus of claim 11 further comprising a profile control mechanism that sets a value in said dedicated memory space during the execution of said second stream of instructions.

14. A program product comprising:
a recordable media; and
a compiler recorded on said recordable media accessible by a computer system for execution on a central processing unit, said compiler having:
  a code generator that converts a first instruction stream into a second instruction stream wherein said second instruction stream includes machine readable code;
  an instrumentation mechanism that inserts instrumentation code into said second instruction stream for profiling purposes; and
  an enabling mechanism that inserts enabling instructions into said second instruction stream wherein said enabling instructions include a mechanism that can enable and disable the execution of said instrumentation code.

15. The program product of claim 14 wherein said enabling mechanism inserts at least one instruction that causes a dedicated portion of a register to be examined to determine if said instrumentation code should be executed.

16. The program product of claim 15 wherein said at least one instruction that causes said dedicated register to be examined instructs at least one of said instrumentation code blocks not to be executed if said dedicated portion of said register is not set to a predetermined value.

17. The program product of claim 15 wherein said dedicated portion of said register is a bit.

18. The program product of claim 15 wherein said register is a condition register.

19. The program product of claim 15 further comprising a profile control mechanism that can set a value in said dedicated portion of said register during the execution of said second instruction stream.

20. The program product of claim 14 wherein said enabling mechanism inserts at least one instruction that causes a dedicated memory space to be examined to determine if said instrumentation code should be executed.

21. The program product of claim 14 wherein said instruction that causes said dedicated memory space to be examined instructs at least one of said instrumentation code blocks not to be executed if said memory space is not set to a predetermined value.

22. The program product of claim 14 further comprising a profile control mechanism that can set a value in said dedicated memory space during the execution of said second stream of instructions.

23. A program product comprising:
a recordable media; and
a compiler recorded on said recordable media accessible by a computer system for execution on a central processing unit, said compiler having:
  a code generator that converts a source code module into an object module wherein said object module includes machine readable code;
  a linker that reads in said object module and outputs a computer program;
  an instrumentation mechanism that inserts instrumentation code into said object module that causes profile information to be collected during the execution of said computer program; and
  an enabling mechanism that inserts at least one enabling instruction into said object module wherein said at least one enabling instruction includes a mechanism that allows said instrumentation code to be enabled and disabled during the execution of said computer program.

24. The program product of claim 23 wherein said enabling mechanism inserts said at least one enabling instruction that causes a dedicated portion of a register to be examined to determine if said instrumentation code should be executed.

25. The program product of claim 24 wherein said at least one instruction that causes said dedicated portion of said register to be examined instructs said instrumentation code not to be executed if said dedicated portion of said register is not set to a predetermined value.

26. The program product of claim 24 wherein said dedicated portion of said register is a bit.

27. The program product of claim 24 wherein said register is a condition register.

28. The program product of claim 24 further comprising a profile control mechanism that sets a value in said dedicated portion of said register during the execution of said second instruction stream.

29. The program product of claim 23 wherein said enabling mechanism inserts said at least one enabling instruction that causes a dedicated memory space to be examined to determine if said instrumentation code should be executed.

30. The program product of claim 29 wherein said instruction that causes said dedicated memory space to be examined instructs said instrumentation code not to be executed if said memory space is not set to a predetermined value.

31. The program product of claim 29 further comprising a profile control mechanism that sets a value in said dedicated memory space during the execution of said second stream of instructions.

32. A method of controlling the generation of profile information during the execution of a computer program that has a plurality of instrumentation code blocks embedded therein, said method including the steps of:

beginning the execution of said computer program on a central processing unit;

causing at least one bit in a condition register to be set to a predetermined value;

checking said at least one bit prior to the execution of each of said instrumentation code blocks;

executing said instrumentation code block if said bit is enabled; and omitting the execution of said instrumentation code block if said bit is disabled.

33. The method of claim 32 wherein said step of omitting the execution of said instrumentation code block if said bit is disabled is accomplished with a branch false instruction.

34. The method of claim 32 wherein said step of causing at least one bit in said condition register to be set to said predetermined value is accomplished with a keyboard command.

35. The method of claim 32 wherein said step of causing at least one bit in said condition register to be set to said predetermined value is accomplished by software control.

36. A method of controlling the generation of profiling information during the execution of a computer program wherein said computer program includes instrumentation code blocks for collecting profile information, said method including the steps of:

compiling a source code module to generate an object module containing machine executable instructions;

inserting instrumentation code blocks into said object module to generate profile information;

inserting at least one enabling instruction at the beginning of each instrumentation code block to check if an enabling bit is set;

creating said computer program from said object module;

executing said computer program;

causing said enabling bit to be set to a predetermined value;

checking said enabling bit prior to the execution of each instrumentation code block;

executing said instrumentation code block if said enabling bit is enabled; and omitting the execution of said instrumentation code block if said enabling bit is disabled.

37. The method of claim 36 wherein said at least one enabling instruction includes a branch false instruction.

38. The method of claim 36 wherein said step of causing said enabling bit to be set to a predetermined value is done from a computer's command line.

39. The method of claim 36 wherein said step of causing said enabling bit to be set to a predetermined value is caused by a software program.

40. The method of claim 36 wherein said enabling bit is in a condition register.

41. A program product comprising:

a recordable media; and an instrumentation program recorded on said recordable media accessible by a computer system for execution on a central processing unit, said instrumentation program having a mechanism that inserts instrumentation code into a stream of machine readable instructions wherein said instrumentation code includes at least one enabling instruction that allows said instrumentation code to be enabled and disabled during the execution of said machine readable instructions.

42. The program product of claim 41 further comprising a profile control mechanism that enables and disables the execution of said instrumentation code during the execution of said machine-readable instructions.

43. The program product of claim 41 wherein said at least one enabling instruction causes a dedicated portion of a register to be examined to determine if said instrumentation code should be executed.

44. The program product of claim 43 wherein said at least one enabling instruction that causes said dedicated portion of said register to be examined instructs said instrumentation code not to be executed if said dedicated portion of said register is not set to a predetermined value.

45. The program product of claim 43 wherein said dedicated portion of a register is a bit.

46. The program product of claim 43 wherein said register is a condition register.

47. The program product of claim 41 wherein said at least one enabling instruction causes a dedicated memory space to be examined to determine if said instrumentation code should be executed.

48. The program product of claim 47 wherein said at least one enabling instruction causes said instrumentation code not to be executed if said memory space is not set to a predetermined value.

* * * * *